(12) United States Patent
Heemstra (10) Patent No.: US 11,035,550 B2
(45) Date of Patent: Jun. 15, 2021

(54) LIGHTING DEVICE

(71) Applicant: SIGNIFY HOLDING B.V., Eindhoven (NL)

(72) Inventor: Tewe Hiepke Heemstra, Veldhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 74 days.

(21) Appl. No.: 16/497,541

(22) PCT Filed: Mar. 27, 2018

(86) PCT No.: PCT/EP2018/057727
§ 371 (c)(1),
(2) Date: Sep. 25, 2019

(87) PCT Pub. No.: WO2018/184907
PCT Pub. Date: Oct. 11, 2018

(65) Prior Publication Data
US 2021/0108779 A1    Apr. 15, 2021

(30) Foreign Application Priority Data

Apr. 6, 2017    (EP) ................................. 17165180

(51) Int. Cl.
| | |
|---|---|
| *F21V 5/02* | (2006.01) |
| *G02B 5/02* | (2006.01) |
| *F21V 5/04* | (2006.01) |
| *F21V 14/00* | (2018.01) |

(52) U.S. Cl.
CPC ................ *F21V 5/02* (2013.01); *F21V 5/045* (2013.01); *F21V 14/003* (2013.01); *G02B 5/0231* (2013.01)

(58) Field of Classification Search
None
See application file for complete search history.

(56) References Cited

U.S. PATENT DOCUMENTS

| | | | |
|---|---|---|---|
| 2,589,014 A | 3/1952 | McLeod | |
| 3,004,470 A | 10/1961 | Hans | |
| 3,523,720 A | 8/1970 | Schiele | |
| 2003/0076237 A1 | 4/2003 | Blumel | |

FOREIGN PATENT DOCUMENTS

EP    1194797 B1    4/2002

*Primary Examiner* — Vip Patel
(74) *Attorney, Agent, or Firm* — Daniel J. Piotrowski (57) ABSTRACT

The invention provides a lens comprising a plurality of imaging regions, each adapted to image a light source to generate a plurality of virtual light sources common to all imaging regions and distributed along a spatial path extending in a direction generally away from the lens. Each imaging region comprises a plurality of sub-regions for focussing the input light source to a corresponding plurality of focal points common to the imaging regions. The focussed light directed to the focal points sub-regions of each imaging region combines so as to form at each focal point a virtual light source. An optical deglaring plate comprising an array of conical optical structures is used with the lens.

14 Claims, 5 Drawing Sheets

LIGHTING DEVICE

CROSS-REFERENCE TO PRIOR APPLICATIONS

This application is the U.S. National Phase application under 35 U.S.C. § 371 of International Application No. PCT/EP2018/057727, filed on Mar. 27, 2018, which claims the benefit of European Patent Application No. 17165180.5, filed on Apr. 6, 2017. These applications are hereby incorporated by reference herein.

FIELD OF THE INVENTION

This invention relates to a lighting device incorporating a lens for focussing a light source to a plurality of focal points.

BACKGROUND OF THE INVENTION

One area of recent development within the field of lighting devices has been that of 'panel-type' lighting devices in which interesting, often dynamic, light effects are created across a laminar front light output surface. These can be used for instance for a decorative effect but also for a functional purpose, for instance to display or communicate information.

One way of providing such a device is to make use of a so-called 'optical deglaring plate', or, in more particular examples, a 'conical deglaring plate'. A conical deglaring plate is formed of a light transmissive array of cone-shaped structures, distributed on a supporting substrate. When spots of light are directed onto a surface of the deglaring plate, the spots are transformed by the optical structure of the plate into corresponding ring-shaped patterns of light, visible to observers on a reverse side of the plate.

Known devices incorporating such plates typically utilise them to provide attractive luminous displays of circular loops and other closed curved forms. In some cases, the structure of the plate is configured such that an apparent brightness or shape of the circular patterns appears to change as a user moves their position relative to the visible surface of the plate.

However, it remains a challenge using such arrangements to generate light outputs having patterns sufficiently interesting or engaging to capture and hold the attention of observers. In particular, observers may quickly grow uninterested or bored of the patterns produced by the device, so that creating a display which remains fully captivating to onlookers for an extended period of time is far from straightforward.

Furthermore, a significant drawback of known devices is that there can be optical distortions in the generated patterns due to the physical set-up of the device. In particular, it may for example be desirable to create displays which include concentric or overlapping circular patterns. However, in known devices, this can only be achieved through the use of multiple light sources aligned linearly with respect to another and at different perpendicular distances from the optical deglaring plate. Such arrangements however typically generate defects in the generated pattern, where light sources more proximal to the deglaring plate obstruct light sources more distally placed, resulting in shadowing in the generated light pattern.

There is a need therefore for an improved means of providing multiple sources of light emitted from different perpendicular distances with respect to an incident surface, in particular so that the above-mentioned shadowing effects may be avoided. There is also a need for optical deglaring plate-based lighting devices capable of making use of such means to provide improved luminous displays.

SUMMARY OF THE INVENTION

The invention is defined by the claims.

Examples in accordance with an aspect of the invention provide a lighting device comprising an optical deglaring plate having an array of conical optical structures for optically processing received light, and a lighting assembly. The lighting assembly comprises a lens and at least one light source arranged in a defined position relative to the lens. The lens comprises a plurality of imaging regions distributed around a central axis of the lens, each of said imaging regions being adapted to image the at least one light source. Each of the imaging regions comprises a plurality of sub-regions for imaging the at least one light source to generate a plurality of virtual light sources common to said imaging regions. The virtual light sources are distributed along a spatial path having a defined relationship with the central axis and extending at least partially in a direction away from the lens. The lens is configured to project, via said plurality of virtual light sources, a corresponding plurality of light outputs onto an incident surface of the optical deglaring plate, the light outputs combining to generate a luminous pattern on said incident surface.

The lens comprised in the lighting device is a Fresnel-type lens formed of a plurality of imaging regions, each sub-divided into multiple sub-regions. The multiple sub-regions enable the lens to create multiple focal points, and more particularly multiple focal points being displaced at different perpendicular distances from the lens. In this way a plurality of virtual light sources may be created using a just a single physical light source. The lens hence provides a means for propagating multiple light outputs in a given direction, originating from multiple effective source locations, without the need to use separate physical light sources to create each one. The multiple light outputs can hence be created without any risk of shadowing effects, since no physical apparatus need be arranged interposed between any of the virtual light sources and a given incident surface.

The spatial path along which the virtual light sources are distributed may in examples be a linear path coinciding with the central axis or running parallel thereto, or the path may be an arcuate path partially coinciding with said central axis or running at least in part alongside said axis.

A linear path enables generation from the lens of a plurality of concentrically overlapping light outputs centred about a common linear axis, each generated by one of the linearly aligned virtual light sources. When projected onto a conical deglaring plate, this enables creation on a reverse side of the plate of a pattern of concentric rings of light.

An arcuate path enables generation of a plurality of overlapping light outputs centred about a series of points, laterally displaced with respect to one another (where lateral indicates a direction perpendicular to a direction of a central axis of the lens). When projected onto an incident surface of a conical deglaring plate for example this creates on a reverse side a pattern of overlapping rings which, when viewed at a certain oblique angle to the plate may appear perfectly concentric and centred on a common point. This configuration may be useful therefore for compensating for any parallax between the rings. In accordance with further embodiments, the lens may comprise two or more subsets of imaging regions, each subset adapted to image a respective light source being placed at a different respective defined location relative to the lens and each subset configured to generate a respective plurality of virtual light sources distributed along a respective spatial path.

In this way multiple distinct sets of virtual light sources may be created, aligned along different respective paths. This may be advantageous for instance for creating light displays for observation by different observers, for instance positioned differently relative to an incident surface onto which the pattern is projected. For instance, the different paths may be characterised by a differing degree of curvature, to thereby create concentric patterns of light outputs suitable for viewing by observers positioned at a respective angles to the incident surface.

To realise multiple focal points from each imaging region, each region is sub-divided into multiple sub-regions, each adapted to focus light to a different one of the plurality of virtual light sources. These different light output directions may be realised by differing refractive properties of each sub-region, or by differently angled light output surfaces of each sub-region.

In accordance with at least one set of embodiments, each of the imaging regions may have a light exit surface formed of a plurality of differently angled light output facets, each of said facets defining a respective light exit surface for each of said sub-regions. The different light output facets may each be angled for directing the light toward a respective one of the plurality of virtual light sources for directing light in that direction. Each light output facet may be differently angled with respect to said central axis for instance.

In examples, the different sub-regions may have identical refractive properties, being distinguished or defined only in respect of the differing angle of the light exit surface bounding them. In this case, the angle of the light exit surface may fully determine the angle at which light exits each sub-region.

In accordance with one or more embodiments, the virtual light sources may (by a different design) form a continuum of virtual light sources. These may either be linearly or arcuately aligned. Where linearly aligned, this may enable projection of a continuous concentric pattern of light outputs. When projected onto a conical deglaring plate, this may enable creation on a reverse side of a continuous pattern of concentric rings. By selectively activating or deactivating certain of the virtual light sources and/or parts of the directional field of the light sources, different of these contiguous rings or sections of these rings may be illuminated or left non-illuminated. This may allow a pattern or image to be built up using the rings. Means for selectively activating or deactivating different virtual light sources and parts of their directional fields will be described in more detail below.

To realise the continuum of virtual light sources, each of the imaging regions of the lens may comprise an arcuate light exit surface, different arcuate sections of said arcuate light exit surface defining respective light exit surfaces for each of the sub-regions. In examples, the sub-regions may have identical refractive properties, being defined only by the differing angle of their respective light exit surfaces. In the case of an arcuate light exit surface, effectively a continuum of sub-regions is hence provided, each directing light to one of a continuum of focal points. The continuum of focal points may effectively define a focal line or caustic.

In preferred examples, the optical deglaring plate may be a conical deglaring plate, by which is meant a deglaring plate comprising an array of conical prism structures. The conical optical structures may refer therefore to conical prism structures. The prism structures populating the plate may be micro-prism structures. The conical prism structures are shaped such that when arranged in array formation they achieve a deglaring effect for light transmitted through the array. Additionally, the shape is such that light from a real or virtual point source is processed by the deglaring plate so as to form a substantially circular or ring-shaped light pattern which to an observer facing a reverse side of the plate appears to be located on the same side of the plate as the virtual light source.

In use, the deglaring plate is typically oriented such that the bases of the micro-prism structures form a set of light entry surfaces for the plate and the tapered surfaces of the structures form a set of light exit surfaces of the plate.

By conical is meant having a basic shape which is at least substantially conical. The conical optical structures may include truncated conical structures, including structures having a truncated or pared cross section (for example a segmentally truncated or pared cross-section). In some cases, one or more of the conical structures may have an adapted base shape, for example a base adapted to exhibit a polygonal shape. Such examples are intended to be covered by the general term 'conical structure'.

Examples in this disclosure may be described primarily with reference to such a 'conical deglaring plate' by which is meant an optical deglaring plate as clarified in the preceding paragraphs. In all cases however, reference to a conical deglaring plate is to be understood as referring to an optical deglaring plate in accordance with the broad disclosure of embodiments described in the present application.

The lens is arranged in optical communication with the optical deglaring plate and such as to generate said plurality of virtual light sources along a spatial path extending at least partially in a direction away from the lens.

Each virtual light source projects a respective light output onto an incident surface of the optical deglaring plate. The combination of these light outputs produces an overall luminous display on the incident surface of the plate.

In the case of a conical deglaring plate, each individual light output is processed by the deglaring plate to generate a corresponding ring (or arc-shaped) light pattern visible on, in front of, or behind the visible surface of the plate.

In accordance with at least one set of embodiments, the lighting device may further comprise a light modulating element arranged in a light path between said at least one light source and the plurality of virtual light sources for modulating light directed to said plurality of virtual light sources in such a way as to configure a shape or intensity profile of each of said corresponding plurality of light outputs.

The light modulating element may be a filter for modulating an intensity or luminance distribution of light either entering the lens, passing through the lens, or exiting the lens en route to forming said virtual light sources. The light modulating element may at least partially be formed by a mask element for blocking transmission of at least a portion of the light directed toward the virtual light sources.

The light modulating element may be adapted to operate on the light entering, passing through or exiting the lens so as to configure one or more of said virtual light sources to project a shaped light output onto the optical deglaring plate. By varying the shape of the light output provided by the virtual light sources, the corresponding shape of the visible luminous pattern generated on the reverse side of the plate may be similarly altered.

In particular examples, the light modulating element may be adapted to configure the virtual light sources to provide a sectorially-shaped light output onto the optical deglaring plate. Sectorially-shaped encompasses any major or minor sectorial portion of a circle, ellipse or similar rounded closed shape. It may for example be a wedge shape (minor sectorial portion), or a circle having a missing wedge-shaped portion (major sectorial portion).

A sectorially shaped light output projected onto the conical deglaring plate generates on the reverse side an arc-shaped luminous pattern (i.e. an open curve shape), the arc having circumferential extension commensurate with the outer circumferential extension of the sectorial shape light output which generated it.

In accordance with examples, the light modulating element may be positioned directly adjacent a light output surface of the lens. Any displacement between the two may lead—if the size of the source is not infinitely small—to distortions in the light display generated on the optical deglaring plate due to so-called 'half-shadowing effects' between the lens and the light modulating element. In such an effect, the light modulation pattern of the light modulating element becomes effectively blurred or dispersed upon projection onto the conical deglaring plate. Sharp boundaries in the pattern are distorted and become convoluted (blurred) boundaries upon being imaged to the plate, and the apparent intensity of the light source as projected appears non-uniform across its extent. The degree or extent of this blurring is determined by the geometry of the optical system and the light source size. The result is a smearing out of the edge of the projected light modulation pattern, as well as crosstalk between the outer and the inner edges of the pattern as a whole.

To mitigate this effect, the light modulating element may be positioned directly adjacent a light output surface of the lens. This helps to significantly reduce any potential such distortions by reducing the optical path length between the lens imaging regions and the light modulating element.

Directly adjacent means arranged contiguous or directly bordering one another. The two may be touching. In particular examples the lens and light modulating element may be physically coupled to one another.

In accordance with one or more embodiments, the light modulating element may be embedded within the body of the lens. The lens may be formed around the light modulating element during manufacture.

The light modulating element may be a static light modulating element adapted to apply a fixed light modulation pattern to light transmitted through it, or a dynamic light modulating element having a configurable light modulating effect.

In accordance with at least one subset of embodiments, the light modulating element may be or comprise a pixelated optical element such as a liquid crystal filter or a liquid crystal display.

The lighting device in this case may typically further comprise a controller for controlling a light modulation pattern applied by the pixelated optical element to light exiting the lens so as to thereby configure said luminous pattern generated on said incident surface of the optical deglaring plate.

Optionally the controller may be configured to address pixels of the pixelated optical element in accordance with a polar co-ordinate system. By addressing the pixels in accordance with polar co-ordinates, the geometric organisation of the pixels better matches the geometry of the lens in cases in particular where the imaging regions of the lens extend annularly around the central axis of the lens. Control is thereby simplified.

Due to half-shadow effects (see above) near sharp transitions or boundaries between sub-regions of the lens, there may in some cases occur a degree of cross-over between rays of outer-most sub-regions of neighbouring imaging regions. In the light pattern projected onto the deglaring plate, this is visible as a degree of cross-coupling between the light outputs of the most distal and most proximal virtual light sources to the lens.

To circumvent this problem, in accordance with one or more embodiments, the light modulating element may be configured to comprise at least one opaque region arranged in optical alignment with at least one boundary between two neighbouring imaging regions of the lens. These may be opaque rings provided on the light modulating element. By blocking light transmitted from thin intermediary regions located at the boundaries between neighbouring imaging regions, the problem of luminous cross-over can be avoided.

In accordance with at least one set of embodiments, the light modulating element may be configured to apply a differing intensity modulation to different sub-regions of each imaging region of the lens so as to realise a differing light intensity at each virtual light source. Varying the light intensity may provide a more interesting or varied luminous display for an observer.

Preferably, the light intensity is configured to increase as a function of distance of the virtual light source from the optical deglaring plate. Light sources more distal from the incident surface may typically be expected to provide onto the incident surface light outputs with lower light intensity (since the same luminous flux is dispersed over a greater area of the incident surface). By increasing the luminous power provided to the virtual light sources as a function of increasing distance from the incident surface, this decline in intensity may be counteracted, thereby providing substantially uniform light intensity across all outputs on the incident surface.

In accordance with a further subset of embodiments, in the case that each imaging sub-region has a light exit surface defined by a respective angled light output facet, each for directing light toward a different respective one of said virtual light sources, the width of each of said facets may vary so as to vary an intensity of light directed to each virtual light source.

Here, the intensity of light provided to each virtual light source is varied by means of the physical configuration of the lens rather than by means of the light modulating element. By increasing the width of a respective light output facet of a sub-region, more luminous flux is directed to the corresponding virtual light source, thereby increasing its brightness or intensity (and vice versa). Again, preferably, this may be utilised to increase the intensity of the virtual light sources as a function of increasing distance from the optical deglaring plate. This may enable homogenising of the brightness of the light outputs provided by the different virtual light sources.

It is noted that the term 'intensity' above is intended broadly as meaning simply brightness or luminous power. It is not to be interpreted narrowly as referring only the physical quantity of power per unit area, although it may mean this in some contexts.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides lighting devices having a lens comprising a plurality of imaging regions, each adapted to image a light source to generate a plurality of virtual light sources common to all imaging regions and distributed along a spatial path extending in a direction generally away from the lens. Each imaging region comprises a plurality of sub-regions for focussing the input light source to a respective plurality of focal points common to all imaging regions. The focussed light directed to the focal points by sub-regions of each imaging region combines such as to form at each focal point a virtual light source.

Figure 1:
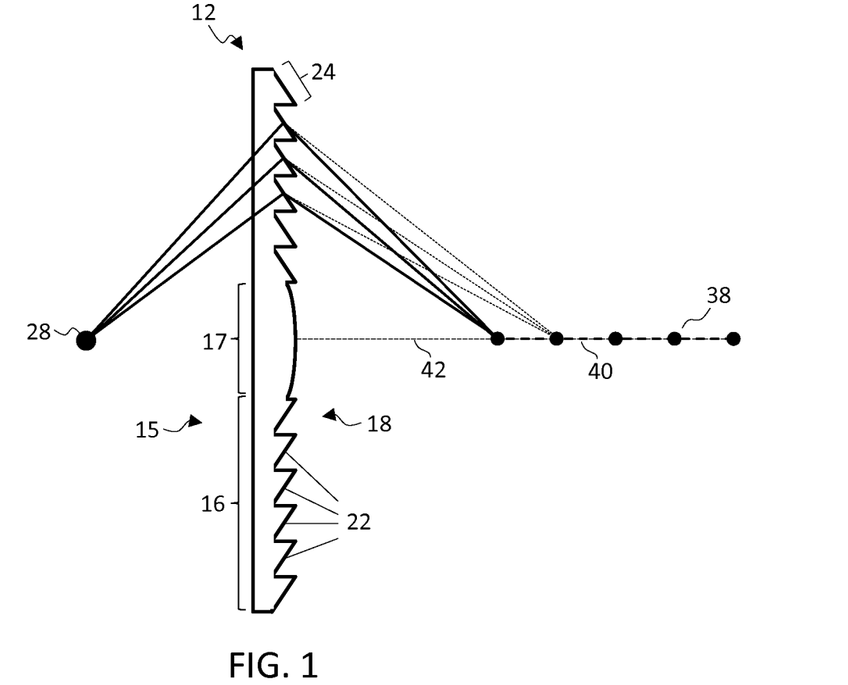
FIG. 1 schematically illustrates an example lens as incorporated within lighting devices in accordance with embodiments of the invention.
Figure 2:
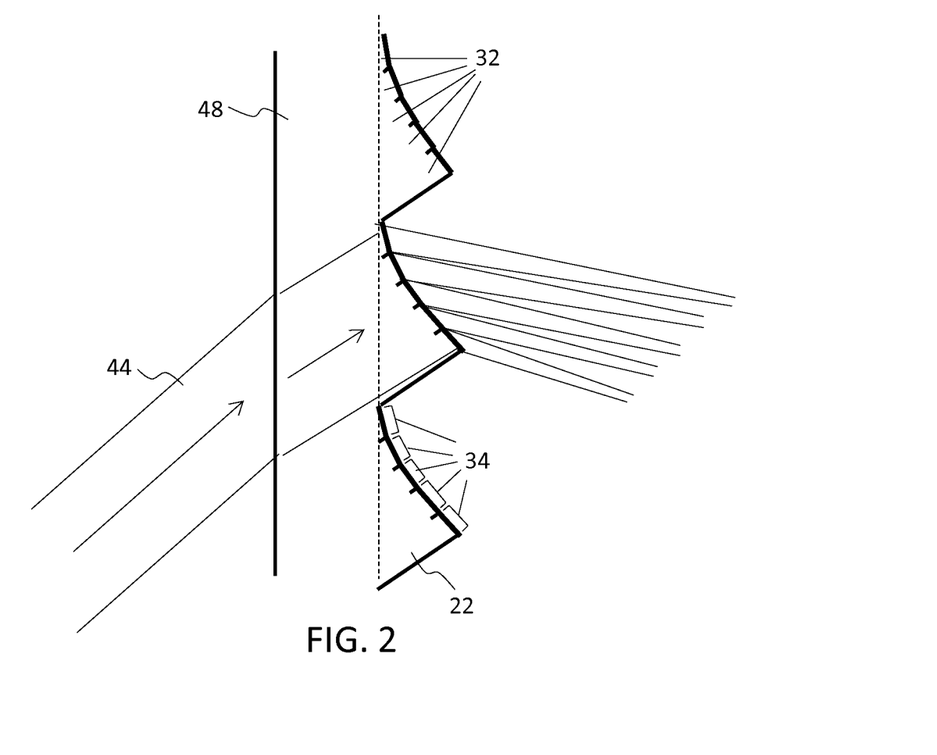
FIG. 2 schematically illustrates the optical functioning of the lens of FIG. 1.

FIG. 1 schematically illustrates a cross-sectional side view through an example lens 12 as incorporated within lighting devices in accordance with embodiments of the invention. FIG. 2 shows a closer cross-sectional view through one portion of the lens. The lens has a light input surface 15 and a light output surface 18. The light output surface across a peripheral region 16 of the lens is formed by respective sloped light output surfaces 24 of a contiguous array of prismatic optical structures 22 distributed across the surface of the lens. Each of said prismatic structures forms a respective imaging region of the lens for imaging a light source located at a defined position 28 relative to the lens. Across a central region 17 of the lens, the light output surface forms a single continuous convex surface section.

In preferred examples, the optical functioning of the lens is refractive (as opposed to utilising total internal reflection). The use of total internal reflection (TIR) in embodiments of the present invention may lead to cross-talk between parts of any observable light effect generated by means of the lens.

Each imaging region 22 comprises a plurality of imaging sub-regions 32 (see FIG. 2), each partially bounded by a respective light output surface section 34 being differently angled with respect to other light output surface sections of the imaging region. Each imaging region is adapted to process received light via its respective set of sub-regions, and to focus that light to each of a plurality of focal points 38 being common to all of the imaging regions of the lens and distributed along a spatial path 40 extending generally away from the lens. The combined focussed light directed to each focal point by the totality of imaging regions of the lens forms at each focal point a virtual light source for directing a light output toward an incident target located optically downstream from the virtual light source.

For clarity of illustration, light is shown as directed into only three of the imaging regions 22 of the lens 12 of FIG. 1. However, it is to be understood that in practice, a light source located at defined location 28 directs light into all imaging regions of the lens, and all regions respectively focus that light to each of the plurality of focal points 38. In particular examples, the light source 28 may be further provided with means for optimising optical coupling between a light source at location 28 and the lens 12, to minimise light losses. This may for instance comprise one or more optical elements for collimating or otherwise shaping or directing the light output of a light source at location 28 so as to be optimally received onto the light input surface 15 of the lens.

Although in the particular example of FIGS. 1 and 2, the sloped light output surfaces 24 of each imaging region are concavely curved, in alternative examples, the light output surface 24 may be convexly curved. This is achievable for instance by reversing the order of the imaging sub-regions 32 and their respective light output surface sections 34. Alternating convex and concave light output surfaces 24 may also be implemented, which may have the effect of reducing any effects of crosstalk between neighbouring imaging regions 22. However, this may not be preferred in some circumstances, since it can also lead to the appearance of artefacts in the observable pattern as the observer changes position.

The optical structure of each imaging region 22 is illustrated in more detail in FIG. 2 which shows the focussing of light received into each imaging region by each respective sub-region 32. For clarity of illustration, the focussing of light by only a single imaging region is shown. Input light 44 is received into the lens 12 through the light input surface 15. The light is transmitted through a transparent central body portion 48 of the lens and received into one of the respective prismatic structures which form the imaging regions 22 of the lens. Light is transmitted through each of the sub-regions in parallel and exits through each of a set of respective light exit surface sections (light exit facets) 34 bounding each of the sub-region, being refracted as it does so. The degree of refraction of the light and the angle of the respective light output surface section 34 bounding the sub-region 32 together determine the angle at which light exits the sub-region. Each sub-region has a light output surface section which is configured such that light exits the sub-region at an angle sufficient to reach a respective one of the common focal points 38 of the lens.

The respective angles required for each of the light exit surface sub-sections 34 may be determined based on Snell's law and using the known or derived refractive index of the lens material (and of air), the known defined location of the light source (and hence the angular displacement of the light source relative to the sub-region concerned), and the desired spatial locations of each virtual light source relative to the location of the sub-region concerned.

In accordance with one or more examples, the widths of the light exit surface sections 34 of different sub-regions 32 may be varied in order to vary an intensity of the different virtual light sources 38. The wider the light exit surface section 34, the greater the intensity of the respective virtual light source to which said surface section is arranged to direct light (and vice versa). This may be useful in cases in which it is desired that light outputs generated from the set of virtual light sources at an incident surface all have uniform intensity, in which case virtual light sources more proximal to the lens may be provided with more light so as to compensate for the greater distance between the virtual light source and any incident surface.

Figure 3:
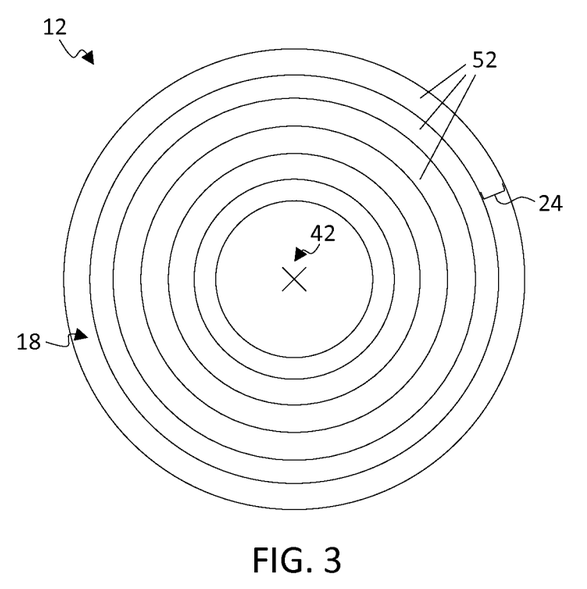
FIG. 3 schematically depicts a front view of the example lens of FIG. 1.

FIGS. 1 and 2 show cross-sectional views through the lens 12 as seen from a side of the lens. FIG. 3 shows a front view of the lens, from which may be seen more clearly the structure of the light output surface 18 of the lens. As shown, the prismatic structures are typically formed by a concentric series of prismatic ring structures 52, extending annularly around a central axis 42 of the lens. In preferred examples, these are circular rings as shown in FIG. 3. However, other shapes are possible, in particular, any closed loop shape, including for example elliptical, square or rectangular might alternatively be used for example.

However, when used in combination with an optical deglaring plate to generate observable ring patterns (as will be described in greater detail below) use of non-circular prismatic ring structures 52 may make generation of the rings more complex. Further optical elements or adaptations may be required for example to achieve the observable rings. In particular, it may be necessary to adapt each prismatic ring to include a plurality of radially extending step portions. In addition to increasing the complexity of the structure, this may also increase the overall height profile of the lens, which may be undesirable where a small form factor is preferred.

In the example of FIGS. 1 and 2, a lens is shown configured to generate a series of virtual light sources distributed along a linear path being parallel and coincident with a central axis 42 of the lens. In this case, the optical properties of each ring, including the angle of each light output surface section 24, may be uniform about the entire circumferential extent of the ring. The optical properties of the light output surface 18 of the lens are in this case circularly symmetric about the central axis 42.

In accordance with further examples however, the lens 12 may be configured to generate virtual light sources distributed along a spatial path which is not parallel and coincident with the central axis 42 of the lens. The spatial path may in some examples be a linear path being parallel but non-coincident with the central axis. In other examples, the path may be a linear path being neither parallel nor coincident with the lens, but nonetheless having a component of extension parallel with the direction of the central axis (i.e. so as to still be extending generally away from the lens).

Where the spatial path deviates very far from the location of the central axis, provision of exactly concentric purely circular prismatic ring structures 52 (see FIG. 3) for focussing the light may become impractical, since the required thickness for the ring may start to exceed achievable manufacturing ranges. As an alternative, in these examples, deviation from exact concentricity of the structures 52 is an option, and/or the shape of the prismatic structure 52 may be adapted to deviate from the pure round shape, and/or the structure may be adapted to include one or more steps in a tangential direction so as to facilitate focussing of light to the required wide-field locations. Additionally or alternatively, the width of one or more of the prismatic ring structures 52 may be adapted to vary around its circumference.

In further examples, the spatial path may be non-linear, extending along a curved trajectory. The non-linear path in some examples may coincide with a portion of the central axis, for example extending approximately linearly along a sub-section of the central axis, before deviating arcuately away from the optical axis. In further examples, the non-linear path may be non-coincident with the central axis but extending at least partially alongside the central axis, by which is meant generally trending in a common direction with the central axis.

In all cases, the spatial path defined by the virtual light sources preferably extends monotonically between a start point being perpendicularly aligned with a first point along the central axis 42, and an end point being perpendicularly aligned with a second, displaced point along the central axis. In this way, all preferred paths have a defined relation with the central axis of the lens, and all extend in a direction 'generally away from' (or equivalently, toward) the light exit surface of the lens.

In cases where the spatial path is not parallel and coincident with the central axis 42, the optical properties of the prismatic optical structures 22 are typically not symmetric about the central axis. This is because to generate a set of points deviating from the (structural) axis of symmetry of the lens (i.e. the central axis 42), different circumferential regions of each ring structure 52 must emit light at a slightly different set of angles, since the focal points will each be at a slightly different distance from the respective region.

Figure 4:
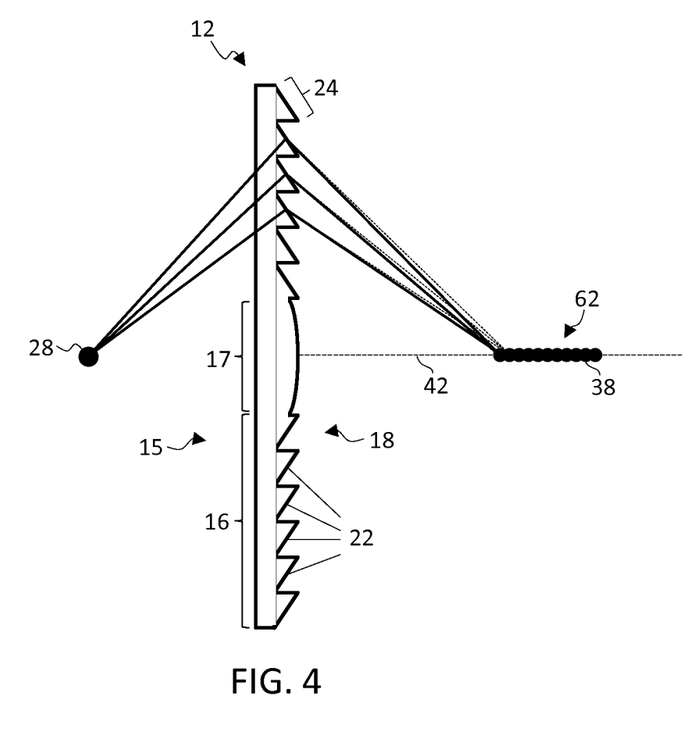
FIG. 4 schematically illustrates a second example lens as incorporated within lighting devices in accordance with embodiments of the invention.
Figure 5:
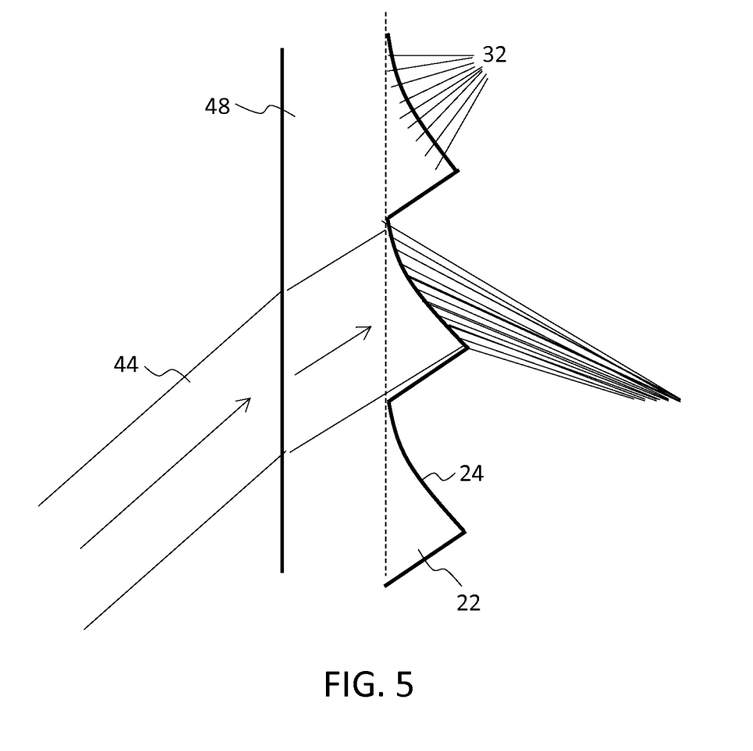
FIG. 5 schematically illustrates the optical functioning of the lens of FIG. 4.

In accordance with a variation of the lens 12 shown in FIG. 1, the lens may be adapted to provide a continuum 62 of partially overlapping virtual light sources distributed along a respective spatial path. An example of an embodiment in accordance with this variation is shown in FIG. 4. The structure of example imaging regions 22 of the lens 12 in accordance with this example is shown in FIG. 5.

The lens 12 in accordance with this embodiment is similar in all respects to that of FIGS. 1 and 2 except that the light output surface 24 of each imaging region is formed by a continuous arcuate surface, rather than a contiguous arrangement of differently angled light output facets 34. For the purposes of the present application, the different sub-regions 32 of each imaging region 22 may be considered to be distinguished from one another only in respect of the particular angle at which light exits the region, this being an emergent property of the angle of the light output surface section bounding the region and the angular displacement between the region and the defined location of the light source 28. Since in the example of FIGS. 4 and 5, the light output surface 24 has no clearly defined angular portions, each imaging region may be effectively considered to be composed of a smooth continuum of sub-regions 32.

As shown in FIG. 4, each sub-region is adapted to process received light and to focus it across an overlapping line of focal points 38 extending in this example parallel and coincident with the central axis 42 of the lens 12. The combined light of the totality of imaging regions forms along the indicated spatial path a continuum 62 of overlapping virtual light sources, effectively creating a line-like light source. For clarity of illustration, in FIG. 4, light is shown as being focussed only to the first two of the continuum of virtual light sources and by only three of the imaging regions 22. However, it is to be understood that in practice, light is focused by all imaging regions to all of the virtual light sources 38.

Although in the examples described above, a lens 12 is shown being configured to image light from a single defined location 28 to a single set of focal points 38, in accordance with further examples, the lens may comprise multiple subsets of imaging regions, each adapted to image light from a different respective defined location relative to the lens to a different set of virtual light sources distributed along a distinct spatial path. Hence multiple sets of virtual light sources can be created in accordance with such embodiments.

Examples of the lens described above have broad application as part of any system or device in which provision of plural virtual light sources located within different focal planes may be of use. These lenses may advantageously be applied for example to any luminous or optical system in which this same effect is currently obtained through use of multiple physical light sources located at different respective distances from a given incident surface.

One particularly advantageous use of the lens is as part of a lighting device utilising an optical deglaring plate to generate a light effect consisting of multiple differently sized rings of light. Examples of this particular application of the lens in accordance with the invention will now be described in detail with reference to FIGS. 6-8.

Figure 6:
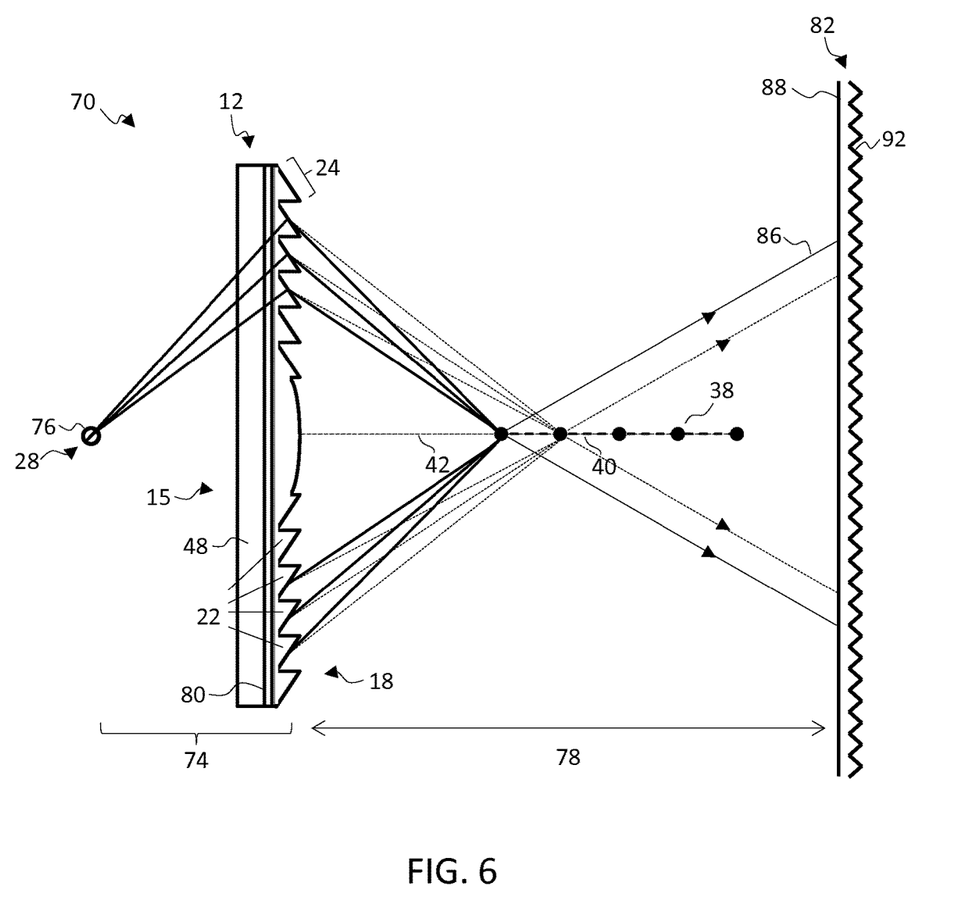
FIG. 6 schematically depicts an example lighting device in accordance with an embodiment of the invention.

FIG. 6 shows an exploded schematic view of a first example lighting device 70 in accordance with an embodiment of the invention. The lighting device comprises a lighting assembly 74 which includes a lens 12 in accordance with an embodiment of the invention, and a light source 76 being arranged in a defined position 28 relative to the lens. Arranged facing the lens, separated by defined separation space 78, is an optical deglaring plate 82. The lens 12 is adapted to receive light from the light source 76 positioned in said defined position and to optically process said light in accordance with the descriptions given above so as to form within said separation space a plurality of virtual light sources 38 distributed along a spatial path 40 extending at least partially between the lens 12 and the optical deglaring plate 82.

Each virtual light source 38 projects a respective luminous output 86 onto an incident surface 88 of the optical deglaring plate 82. The projected luminous outputs together generate a luminous pattern on the incident surface of the deglaring plate. The optical deglaring plate comprises an array of conical optical structures 92 for optically processing the generated luminous pattern in order thereby to generate a resultant light display on a reverse side of the plate. In preferred embodiments, the optical deglaring plate is a 'conical deglaring plate', which, as described in the preceding section of this disclosure, is composed of an array of conical optical structures. A conical deglaring plate has the effect of transforming any incident light output from a point source into a corresponding ring or arc or light, the radius of the arc or ring being commensurate with the distance between the point source and the optical deglaring plate, the circumferential extent of the arc being commensurate with the presence or absence of light in the sector of the cone of light hitting the optical deglaring plate, and the shape of the arc or ring being commensurate with the shape of the conical optical structures that comprise the optical deglaring plate.

Although in the example of FIG. 6, the spatial path 40 extends only part way toward the deglaring plate 82, in one or more advantageous examples, the spatial path 40 may extend all the way to the optical deglaring plate 82. In this case, the series of virtual light sources is optically processed in the form of a corresponding series of complete observable ring shapes.

In an alternative set of examples, the plurality of virtual light sources 38 may start exactly at the optical deglaring plate 82 and extend away from the plate towards the observer, also generating an observable disc shape.

Alternatively again, the plurality of virtual light sources may start at one side of the optical deglaring plate and end on the alternate side. This configuration generates an observable pattern formed of a superposition of two discs, not necessarily of the same size. Spatial paths that are entirely on one side of the optical deglaring plate (and not extending to reach the plate) will be processed to form an observable ring shape. Positions of virtual light sources behind the light source are also possible.

The lens 12 may be generally in accordance with any embodiment of the invention, including but not limited to any of the embodiments described in detail in the preceding paragraphs. In accordance with the example of FIG. 6, the lens is similar in all respects to the example lens 12 of FIGS. 1 and 2, except for comprising the additional component of a light modulating element, or light modulation layer 80, embedded within the body of the lens between the array of prismatic structures 22 at the light output surface 18 of the lens and the central body portion 48 of the lens. Light passing from the central body portion to any of the prismatic structures 22 passes through the light modulation layer 80 which operates on the light in accordance with a defined light modulation function or operation. The light modulation layer is adapted to modulate the light passing into each imaging sub-region 32 in such a way as to configure a shape or intensity profile of the light output generated by each respective virtual light source 38. Thus, by configuring the optical properties of the light modulation layer 80, the configuration of the luminous pattern projected onto the conical deglaring plate by the virtual light sources, and hence the resultant light display generated on the reverse side of the plate, can correspondingly be configured.

The light modulation layer 80 may, in accordance with at least one set of embodiments, be a static filter layer, adapted to apply a fixed light modulation pattern to light entering each imaging sub-region 32 of the lens 12. The filter may act to modulate an intensity of light entering each imaging sub-region. This may be a uniform intensity modulation applied to the light entering the sub-region, or may be a spatially non-uniform modulation, applying a light modulation pattern or distribution to light entering the sub-region. The filter may act to selectively block specific spatial portions of the light entering one or more sub-region, so as to thereby apply a shape to the light entering the sub-region.

The filter may in accordance with one example be a mask layer for blocking certain spatial portions of light entering one or more sub-regions, formed for instance at least partially of chromium. However, in further examples, the filter may be formed of any suitable material for altering the intensity or other optical properties of light passing through the filter.

In accordance with a further set of embodiments, the light modulation layer 80 may be a dynamic light modulation layer adapted to apply a dynamically configurable light modulation effect. In these cases, the lighting device may further comprise a controller operatively coupled with the light modulation layer for controlling a light modulation pattern applied by the light modulation layer. The dynamic light modulation layer is preferably a pixelated optical element and in particular a liquid crystal filter or liquid crystal display comprising individually addressable pixels. A liquid crystal filter can be digitally controlled by means of a suitable controller to exhibit a configurable light modulating pattern across its pixelated surface.

In order to optimise the configurability of the light modulation effects provided by a liquid crystal filter or display, it is preferable that the pixels of the liquid crystal filter or display are aligned with the imaging regions 22 and/or sub-regions 32 of the lens 12. In this way, modulation of light passing into each imaging region or sub-region can be independently configured. It may improve processing efficiency in this case to configure the controller to address the pixels of the liquid crystal filter or display in terms of polar co-ordinates (defined in accordance with the pitch of the imaging regions 22) rather than Cartesian coordinates.

By addressing the pixels in polar co-ordinates, the geometric organisation of the pixels better matches the geometry of the lens in cases in particular where the imaging regions of the lens extend annularly around the central axis of the lens (as in the example of FIG. 3. Control is thereby simplified.

As discussed above, in preferred embodiments, each virtual light source is provided light from a respective one of the plurality of sub-regions 32 forming each imaging region 22. Modulation of light directed to a given virtual light source therefore, requires parallel modulation action to be taken in respect of sub-regions of every imaging region across the lens. In order to simplify control of the liquid crystal filter or display in this case therefore, pixels of the LCD filter or display may be grouped by the controller according to the particular virtual light source 38 with which the sub-region they are aligned with is optically associated. Control of the modulation of light directed to a given virtual light source may therefore be simplified, since the controller may simultaneously apply the same modulation pattern or action to all pixels in a given group.

Alternatively, more complex control may be enabled by further breaking down the groups according to the circumferential (i.e. polar) angle at which a given pixel of the LCD filter or display is disposed relative to the central axis 42 of the lens. According to this scheme, all pixels aligned with sub-regions associated with the same virtual light source 38 and disposed at the same circumferential (i.e. polar) angle to the central axis are grouped and controlled as one by the controller. This added angular organisation enables angular patterns of light modulation to be applied to virtual light sources, in order for instance to generate arcs of a given circumferential extent. This will be described in greater detail below.

Addressing the pixels in accordance with either of the schemes discussed above may be achieved through adapting the programming of the controller and/or may be achieved by adapting the physical wiring between the controller and the liquid crystal display or filter. In particular, the wiring of the LCD display or filter may be significantly simplified in the case that the pixels are grouped as discussed above, since a whole group of pixels may be addressed using a single common wire, rather than providing separate wires. This both simplifies the construction of the system 70, and simplifies the control operations required by the controller, improving processing efficiency.

The angle at which light is directed through different cells or pixels of the liquid crystal display or filter is dependent upon the position of the cell relative to the defined light source location 28. Light passing at a more oblique angle through the cell travels a greater path length in crossing the cell, thereby experiencing a greater relative light modulation effect than light passing at a less oblique angle. This may lead to disparities in the modulation effect of the liquid crystal filter or display depending upon the position of the cell within the filter or display. It hence may be preferable to vary the thickness of the cells or pixels of the liquid crystal filter in accordance with the average angle at which light is to pass through, so as to thereby compensate for this variation.

Although in the example of FIG. 6, the light modulation layer 80 is provided embedded within the lens 12, in further examples, the light modulation layer may be arranged adjacent the light input 15 or light exit 18 surface of the lens. It is preferable that there is as little separation (i.e. optical path length) as possible between the light modulation layer and the lens so as to prevent optical distortions in the light directed to the virtual light sources 38. Hence, the light modulation layer may be physically coupled to the light exit surface 18 or light entry surface 15 of the lens.

In further examples, it may be more advantageous to embed for instance a flat optical modulation layer within the body of the lens, rather than couple such a layer to an optical surface. A flat layer is typically simpler and easier to manufacture than a layer disposed on the lens light output surface 18. Furthermore, an embedded layer advantageously ensures minimal possible optical path length between the prismatic optical structures 52 of the lens and the light modulation layer (thereby reducing half-shadowing effects—see above for details). Additionally, in this case the number of undesired Fresnel reflections at the lens-air interface is also minimized.

Figure 7:
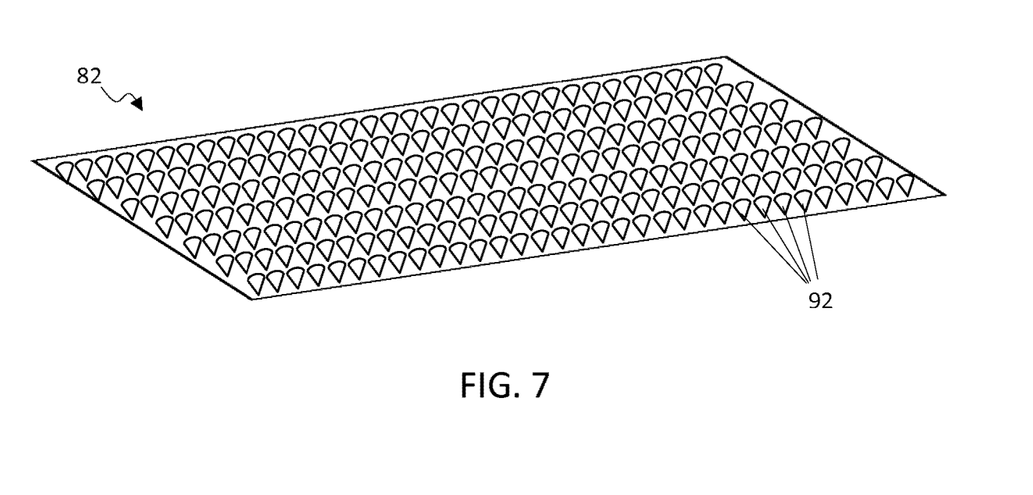
FIG. 7 schematically depicts an example optical deglaring plate as incorporated within lighting devices in accordance with embodiments of the invention.

The optical structure of a conical deglaring plate as incorporated within lighting devices according to the invention is schematically illustrated in FIG. 7 which depicts a base-side view of an example conical deglaring plate 82. The plate in accordance with this example comprises an array of conical optical structures 92 distributed in a planar formation. In examples, the deglaring plate may be an integrally formed body. The plate may be formed exclusively from the array of conical optical structures, the cones for example bonded contiguously to one another to form the structure of the plate. Alternatively, neighbouring conical structures may be disposed apart from one another, separated by a section of intermediary material. This may be a light-transmissive material, but more advantageously may be an opaque material so as to prevent a direct view of the (typically very bright) virtual light sources 38 being exposed to observers, which would be undesirable for reasons of comfort, safety and aesthetics. In further examples, the conical deglaring plate may comprise an optical base sheet, upon which are arrayed the plurality of optical structures 92.

Although the particular example deglaring plate of FIG. 7 comprises a planar formation of conical structures, in alternative examples the plate may exhibit some curvature, defining a continuous curved optical surface, rather than a planar surface.

FIG. 7 shows a base-side view of an example deglaring plate 82. In operation, light is directed onto the 'upper' surface of the plate (the reverse side to that visible in FIG. 7), falling incident onto the bases of one or more of the conical optical structures. Light from a point source is processed as it passes through the structures, resulting in the generation of a virtual image or impression of an illuminated ring in front or behind the plate 82, or a dot which appears positioned in the plate 82

One example conical deglaring plate 82 having a structure in accordance with requirements of the invention is provided commercially by Karl Jungbecker GmbH & Co. of Olpe, Germany (referred to as a 'conical deglaring prism').

In examples which follow, reference may be made in particular to use of a conical deglaring plate. This is to be interpreted as referring to an optical deglaring plate as described broadly in accordance with embodiments of the present application and as clarified by the above description: an optical deglaring plate comprising an array of conical optical structures for optically processing the generated luminous pattern. The term is not to be construed therefore as introducing any additional limitation of the scope of the invention.

As described above, the light modulation layer 80 operates on light passing between the light source 76 and the virtual light sources 38 in such a way as to configure the shape or intensity profile of the light output generated by each virtual light source on the incident surface 88 of the conical deglaring plate 82.

By controlling the shape of the light output provided by the virtual light sources 38, the corresponding shapes of the visible luminous patterns generated on the reverse side of the plate may similarly be controlled.

In particular examples, the light modulating element 80 may be adapted to configure the virtual light sources to provide a sectorially-shaped light output onto the optical deglaring plate. The term sectorially-shaped encompasses any major or minor sectorial portion of a circle, ellipse or similar rounded closed shape. It may for example be a wedge shape (minor sectorial portion), or a circle having an absent wedge-shaped portion (major sectorial portion).

A sectorially shaped light output projected onto the conical deglaring plate generates on the reverse side of the plate an arc-shaped luminous pattern (i.e. an open curve shape), the arc having circumferential extension commensurate with the outer circumferential extension of the sectorially shape light output from which it was generated.

Figure 8:
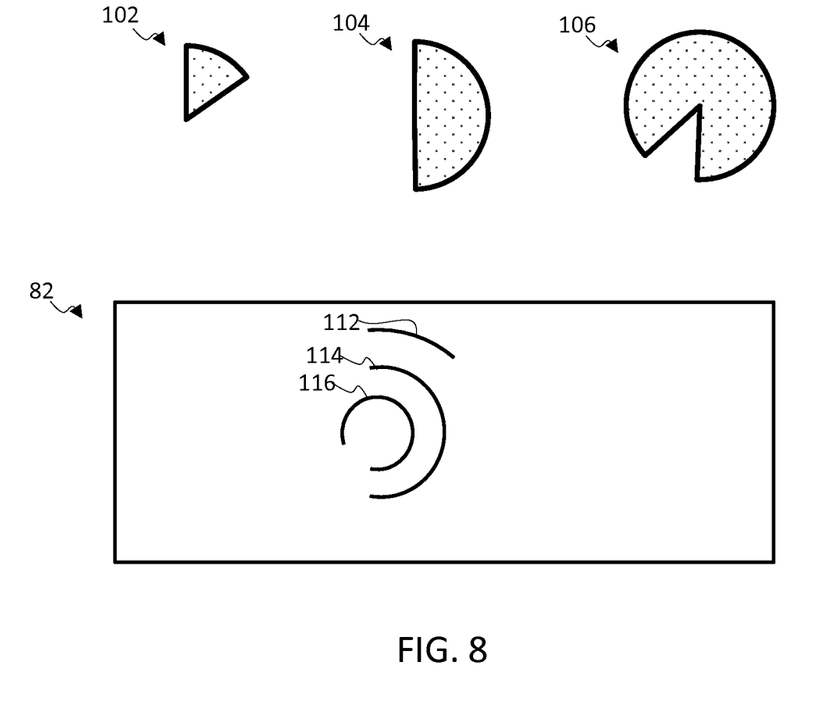
FIG. 8 schematically depicts three example light outputs for projection onto an optical deglaring plate and the corresponding light patterns generated at the reverse side of the plate.

This effect is schematically illustrated in FIG. 8 which shows (top) a set of three sectorially shaped light outputs 102, 104, 106 for projection onto an incident surface of the conical deglaring plate and (bottom) the corresponding arc-shaped light effects 112, 114, 116 generated on the reverse side of the deglaring plate when the three light outputs are projected concurrently onto the plate. Light output 102 for the purposes of the example of FIG. 8 is taken to originate from a virtual light source that is farthest from the optical deglaring plate, and light output 106 from a virtual source that is nearest to the optical deglaring plate. The virtual light sources are in this case taken to be aligned along a linear spatial path extending parallel to the lens central axis 42.

As shown, the sectorial light effects are concentrically arranged due to the linear arrangement of the virtual light sources 38 and are of differing sizes due to the varying displacement of each virtual light source from the conical deglaring plate 82. As explained above, a more distantly positioned light source (relative to the deglaring plate) will produce a relatively larger light pattern on the visible surface of the deglaring plate. A more closely positioned light source produces a relatively smaller light pattern. Hence, the axially aligned set of three light sources generates concentrically arranged (in this case arc-shaped) luminous patterns.

Generation of sectorially shaped light outputs, and corresponding arc shaped processed light effects, such as those shown in FIG. 8, may be achieved through selective masking of appropriate circumferential regions of corresponding light output surface sections 34 of the lens 12. This will now be explained in detail with reference to FIG. 2.

In FIG. 2 is shown the processing of light by an example imaging region 22 of the lens, the imaging region comprising five imaging sub-regions 32, each having a respective light output surface section 34 angled to direct light to a respective one of five virtual light sources 38 (shown in FIGS. 1 and 6). It is furthermore assumed that each imaging region extends circumferentially around the lens as part of an approximately circular prismatic ring structure 52 (see FIG. 3 and description above).

In the case of no modulation of light directed to each virtual light source, each source directs onto the incident surface 88 of the optical deglaring plate 82 a complete round (e.g. approximately circular) light output which is processed by the plate to generate a visible ring-shaped light effect. The combination of five virtual light sources produces a concentric set of five rings.

By way of example, consider that it is desired that rings 1, 2, 4 and 5 be complete rings, while ring 3 is reduced to a 180° arc. In this case, the third (i.e. middle) light output surface section 34 should be covered with an opaque modulation layer over 180° of its full circumference around the lens 12. Furthermore, the same should be done for each corresponding light output surface section 34 (i.e. the third surface section) in each imaging region of the lens. In this way, every imaging sub-region arranged to direct light to the third virtual light source 38 is covered in the same way across the same 180° of its circumference around the lens. The result is that light is effectively only directed to the third virtual light source from one half of the lens, and as a result the image of the light source 18 produced at the virtual light source is suppressed across one half. When this suppressed or pared virtual light source is directed onto the conical deglaring plate, an approximately semi-circular light output is produced instead of a circular one, which is then processed by the plate to generate a corresponding 180° arc-shaped light effect. The overall result is a concentric arrangement of two visible ring shapes, followed by the 180° arc, followed by the further two rings.

This principle may be applied to generate arcs of any desired circumference and concentric arrangements of rings and arcs of any desired pattern or configuration. As noted above, although only five virtual light sources (and corresponding light output surface sections) are shown in the figures, this is for clarity of illustration only. In general, a lens is provided sufficient to generate a larger number of virtual light sources, from which a more complex pattern of rings and arcs can be generated with the above-described principle. Where a continuum of virtual light sources is produced (see above for description), so that contiguous concentric rings are generated, it is even possible to create images by appropriately shaping each arc generated arc shape as described above (see below for further detail). By using a liquid crystal filter as a light modulation layer, the complex light modulation pattern necessary to achieve for instance an image or a string of images may be readily realised.

In the case of a large number of imaging subsections and virtual light sources (such as in the case of a continuum of sources), half-shadowing effects (see above) may mean that the resolution of each generated ring and arc is imperfect, so that neighbouring rings may blur to a certain extent. For the sharpest resolution of rings, the light source 76 should be as small as possible, and the light modulation element 80 should be provided as close as possible to the imaging regions of the lens (i.e. with minimal optical path length between them).

Where the light modulating layer is a liquid crystal filter or display having a controller, the controller may be configured to control the filter or display to selectively activate or deactivate certain parts of, or the whole of, a number of virtual light sources in accordance with a certain control schedule in order thereby to create a dynamic light effect across the visible surface of the optical deglaring plate. Selective activation or deactivation of (parts or the whole of) individual virtual light sources may be achieved as described above, by increasing the opacity of sections of the liquid crystal filter covering appropriate circumferential regions of the set of imaging sub-regions optically associated with a given virtual light source. In this way, some or all light previously directed to a given focal point to generate the respective virtual light source is blocked. Where all of the light is blocked, the virtual light source is effectively deactivated entirely, with the result that the lighted ring corresponding to that source 40 will disappear from the visible pattern generated by the optical deglaring plate. As described above, this will require that every light output surface section 34 arranged to direct light to the given virtual light source is blocked in the same way.

A controller of the liquid crystal filter may be programmed with control instructions for executing a certain control regime of activation and deactivation of selected virtual light sources. In this way, a dynamic light effect may be created on the reverse side of the optical deglaring plate configured for example to maintain the attention of observers or to convey information.

This dynamic control may be combined with the light shaping effect described above to, for example, create a dynamic display of arc shapes of varying circumferential extensions. These extensions could be dynamically varied by appropriately altering the modulation pattern applied by the liquid crystal filter to increase or decrease the circumferential extension of the sectorial light outputs projected onto the conical deglaring plate 82.

As discussed above, in accordance with one set of embodiments, the lens may be adapted to generate a continuum 62 of virtual light sources. It is possible to configure the continuum of virtual light sources such as to create on the optical deglaring plate 82 a concentric arrangement of light outputs sufficient to generate on the reverse (visible) side of the plate an exactly contiguous set of concentric rings which together fully cover a circular region of the deglaring plate (creating a fully illuminated disk shape). Where a liquid crystal filter is provided, it is then possible to execute dynamic control of this contiguous set of rings, selectively activating or deactivating different of the rings, and/or altering the circumferential extent of one or more of the rings so as to form arc shapes of a particular size and orientation. Since the full set of rings is configured to completely cover an entire region of the optical deglaring plate, it is possible through appropriate dynamic control of the liquid crystal filter to generate any desired pattern, shape or even image across that region by controlling appropriate sections of each of the set of concentric rings to illuminate, while deactivating remaining sections.

In order to realise this embodiment, it is necessary that neighbouring concentric rings exactly adjoin one another in order to form a continuous region of light. If there is in some cases non-overlap between neighbouring rings, this may be remedied by applying a small radial surface ripple across each imaging region. By 'ripple' is meant a slight wave-like undulation in the light output surface of the imaging region, the undulation having a certain "wavelength" (i.e. a peak-to-peak distance of the ripple).

The ripples have the effect of radially widening each generated virtual light source, such that the corresponding generated pattern of rings and arcs more closely tessellate. One example for instance is a two-step saw-tooth-shaped ripple. A source observed through a transparent material having such a ripple appears as two apparent overlapping sources, one being positively offset in its position and the other negatively offset. The ripple should have a "wavelength" (peak-to-peak distance) which is small compared to the projected size (e.g. diameter) of the light source, e.g. 10 times smaller, or more preferably 100 times smaller) in order to avoid discontinuous jumps in apparent position of the projected source as an observer moves relative to the optical deglaring plate 82.

To improve overlap or tessellation between all of the rings generated by the lens 12, a similar such ripple should be applied to every imaging region surface section 34 and around the entire circumferential extent of each imaging region 22. The gradient or incline angle for each ripple and the ripple "wavelength" (peak-to-peak distance) should be adjusted (based on Snell's law) in dependence upon the distance of each imaging sub-region 32 from the center of the lens, as well as the required location for the virtual light source, and the known location of the input light source 28.

One possible means for fabricating the lens in accordance with the embodiment of FIG. 6 will now be described.

A layer of photosensitive di-acrylic monomer fluid is applied on a negative mould of the desired (light output) surface structure for the lens. When hardened, this will form the array of prismatic optical structures 22. Where the light modulating layer 80 of the lens is for instance a static, chromium mask layer, a mask structure comprising the chromium mask and being covered over by a glass layer is then applied. The glass layer forms the transparent central body portion 48 of the completed lens. When applying the filter structure, it must be carefully positioned so as to ensure that the pattern of the filter correctly aligns with the optical structures 22 of the lens.

Ultraviolet light is then used to harden the di-acrylic. A UV-transparent mould may be used to enable penetration of the light to the di-acrylic, or the transparent portions of the filter pattern may be utilised to transmit the UV light to the di-acrylic.

Although di-acrylic is used in particular in this example, this is by way of illustration only, and in other examples, other monomers may be used which are similarly capable of being photo-polymerised so as to form the array of prismatic optical structures.

Following hardening, the mould and the lens are separated.

As an alternative to the use of UV light, other hardening processes may alternatively be used such as temperature and/or chemical initiated hardening.

In examples, additional adhesion promoting layers or mould loosening layers may be utilised to improve the fabrication process.

Further to the above described method, other methods for forming Fresnel-like surfaces, such as hot embossing, will be well known to the skilled person and may be suitably applied for fabricating lenses in accordance with the present invention.

Although the above example method is described in relation to a lens incorporating a static chromium mask layer, the same method may be used to provide a lens having a liquid crystal filter. Application of the chromium mask may simply be replaced by application of the liquid crystal filter.

The filter structure of the preceding method comprising the static chromium mask layer covered over by a glass layer may be fabricated, by way of example, as follows.

The lens base (the transparent central body portion 48) may first be formed and this used as a glass carrier for the filter. A chromium layer is then evaporated on the glass. UV-sensitive photoresist is applied. UV light is then applied to the photoresist in accordance with a desired etch pattern for the chromium mask layer, typically using a suitable corresponding UV mask. The remaining photoresist is then developed, yielding an etch mask. The chromium is then etched. Suitable chemical means for etching the chromium will be apparent to the skilled person.

Although examples have been described above which include a liquid crystal filter or display, in further examples, alternative dynamic light modulation means may be employed, such as for example electrowetting.

Applications for example lighting devices in accordance with the present invention are numerous, and include, by way of example: applications in trade fairs (to catch the eye and attract the interest of passers-by), use within shops for brand imaging or within shop windows to attract passers-by, use for entertaining customers or visitors waiting in queues, use for entertaining passers-by within tunnels, passages, elevators, escalators, mechanical walkways, for example at a railway station, use at airports to amuse travelers or to display information, use within water slides at swimming pools or as part of theme park adventure rides (e.g. to provide a view or display from moving cars of the ride), use for showing the rings forming the Olympic games symbol, or use to illuminate disco dance floors.

In a further set of applications, lighting devices may be incorporated within certain objects or as part of other devices. For instance, lighting devices may be incorporated within an exterior visible surface of a luminaire (to provide additional aesthetic effect to the illumination function), or within the wall of a transparent flower vase, powered by batteries for example. They may similarly be incorporated in the wall of a champagne or white wine cooler for example. Here, condensing water may influence the optical effect. To prevent this, the device may be installed inside a double-walled cavity. The device may also in this case further comprise or be connected with a thermometer, and be controlled to change a generated luminous pattern in dependence upon the temperature. Additionally, powering of the device might be achieved through thermopile or another form of energy harvesting, so that there is no need to replace batteries, and hermetic sealing can as a result be better provided.

The device might in examples be installed within beverage vessels, e.g. a glass coffee mug. Here, energy for powering the device may for example be harvested from the heat of the beverage. Buildings having a glass front might also make use of the device to display decorative or informational light displays, visible for example from a highway or railway line.

Examples of the device might be incorporated in greenhouses near airports and adapted for instance to beam vertically, visible from an airplane, for assisting in navigation.

Examples of the device might be used as part of traffic signs (displaying messages or information), or as part of traffic lights to provide traffic signals.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

What is claimed is:

1. A lighting device comprising:
an optical deglaring plate comprising an array of conical optical structures for optically processing received light; and
a lighting assembly,
wherein the lighting assembly comprises:
a lens; and
at least one light source arranged in a defined position relative to the lens,
wherein the lens comprises a plurality of imaging regions distributed around a central axis of the lens, each of said imaging regions being adapted to image the at least one light source,
wherein each of the imaging regions comprises a plurality of sub-regions for imaging the at least one light source to generate a plurality of virtual light sources common to said imaging regions,
wherein the virtual light sources are distributed along a spatial path having a defined relationship with the central axis and extending at least partially in a direction away from the lens, and
wherein the lens is configured to project, via said plurality of virtual light sources, a corresponding plurality of light outputs onto an incident surface of the optical deglaring plate, the light outputs combining to generate a luminous pattern on said incident surface.

2. A lighting device as claimed in claim 1, wherein:
the spatial path is a linear path coinciding with the central axis or running parallel thereto, or
the spatial path is an arcuate path partially coinciding with said central axis or running at least in part alongside said axis.

3. A lighting device as claimed in claim 1, wherein the lens comprises two or more subsets of imaging regions, each subset adapted to image a respective light source being placed at a different respective defined location relative to the lens and each subset configured to generate a respective plurality of virtual light sources distributed along a respective spatial path.

4. A lighting device as claimed in claim 1, wherein each of said imaging regions has a light exit surface formed of a plurality of differently angled light output facets, each of said facets defining a respective light exit surface for each of said sub-regions.

5. A lighting device as claimed in claim 1, wherein the virtual light sources form a continuum of virtual light sources.

6. A lighting device as claimed in claim 5, wherein each of said imaging regions comprises an arcuate light exit surface for generating said continuum of virtual light sources, different arcuate sections of said arcuate light exit surface defining respective light exit surfaces for each of said sub-regions.

7. A lighting device as claimed in claim 1, further comprising a light modulating element arranged in a light path between said at least one light source and the plurality of virtual light sources for modulating light directed to said plurality of virtual light sources in such a way as to configure a shape or intensity profile of each of said corresponding plurality of light outputs.

8. A lighting device as claimed in claim 7, wherein said light modulating element (80) is positioned directly adjacent a light output surface of the lens or is embedded within the body of the lens.

9. A lighting device as claimed in claim 7, wherein the light modulating element comprises a pixelated optical element, wherein said pixelated optical element is one of a liquid crystal filter or a liquid crystal display.

10. A lighting device as claimed in claim 9, wherein the lighting device further comprises a controller for controlling a light modulation pattern applied by the pixelated optical element to light exiting the lens so as to thereby configure said luminous pattern generated on said incident surface of the optical deglaring plate, and optionally wherein the controller is configured to address the pixels of the pixelated optical element in accordance with a polar co-ordinate system.

11. A lighting device as claimed in claim 7, wherein the light modulating element comprises at least one opaque region in optical alignment with a boundary between two neighbouring imaging regions of the lens.

12. A lighting device as claimed in claim 7, wherein the light modulating element is configured to apply a differing intensity modulation to different sub-regions of each imaging region of the lens so as to realise a differing light intensity at each virtual light source.

13. A lighting device as claimed in claim 1, wherein in case each imaging sub-region has a light exit surface defined by a respective angled light output facet, each for directing light toward a different respective one of said virtual light sources, the width of each of said facets varies so as to vary an intensity of light directed to each virtual light source.

14. A lighting device as claimed in claim 12, wherein said light intensity is configured to increase as a function of distance of the virtual light source from the optical deglaring plate.

* * * * *